(12) United States Patent
Lauder

(10) Patent No.: US 7,729,613 B2
(45) Date of Patent: Jun. 1, 2010

(54) APPARATUS FOR OPTICAL PATH MONITORING AND AN OPTICAL SHUTTER FOR PREVENTING SIGNAL TRANSIMISSION IN A FAULTY OPTICAL PATH

(75) Inventor: Andrew G. Lauder, Cambridge (GB)

(73) Assignee: Ericsson AB, Stockholm (SE)

( * ) Notice: Subject to any disclaimer, the term of this patent is extended or adjusted under 35 U.S.C. 154(b) by 935 days.

(21) Appl. No.: 10/432,563

(22) PCT Filed: Nov. 27, 2001

(86) PCT No.: PCT/GB01/05237

§ 371 (c)(1),
(2), (4) Date: Nov. 18, 2003

(87) PCT Pub. No.: WO02/45298

PCT Pub. Date: Jun. 6, 2002

(65) Prior Publication Data

US 2004/0071392 A1    Apr. 15, 2004

(30) Foreign Application Priority Data

Nov. 28, 2000 (GB) ................................ 0028919.9

(51) Int. Cl.
*H04B 10/08* (2006.01)
*H04B 17/00* (2006.01)

(52) U.S. Cl. ............... 398/15; 398/4; 398/6; 398/7; 398/30

(58) Field of Classification Search ............. 398/15, 398/13, 3, 4, 5, 6, 7, 94, 30
See application file for complete search history.

(56) References Cited

U.S. PATENT DOCUMENTS

| 5,104,391 | A | * | 4/1992 | Ingle et al. ..................... 606/11 |
| 5,296,957 | A | * | 3/1994 | Takahashi et al. ........... 398/177 |
| 5,315,674 | A | | 5/1994 | Asako |
| 5,442,479 | A | * | 8/1995 | Bulow et al. ........... 359/341.44 |
| 5,625,478 | A | * | 4/1997 | Doerr et al. ..................... 398/4 |
| 5,903,371 | A | * | 5/1999 | Arecco et al. .................. 398/4 |
| 6,040,931 | A | * | 3/2000 | Miyazaki et al. .............. 398/23 |
| 6,115,155 | A | * | 9/2000 | Liu et al. ......................... 398/5 |
| 6,323,973 | B1 | * | 11/2001 | Hongou ....................... 398/15 |
| 6,473,397 | B1 | * | 10/2002 | Au ............................. 370/223 |
| 6,483,616 | B1 | * | 11/2002 | Maddocks et al. ............. 398/1 |

(Continued)

FOREIGN PATENT DOCUMENTS

EP            0 437 162 A2    7/1991

(Continued)

*Primary Examiner*—Nathan M Curs
(74) *Attorney, Agent, or Firm*—Kirschstein, et al

(57) ABSTRACT

The invention provides an optical shutter (400) for a communication system of a type comprising first ($B_1$, $B_2$) and second ($A_1$, $A_2$) communication paths along which information-bearing radiation propagates in opposite directions. The shutter (400) comprises: an optical tap (440) and a power monitor (430) for monitoring power of information-bearing radiation propagating along the first path ($B_1$, $B_2$) and for generating a corresponding radiation power indicative signal; a control unit (420) for comparing the indicative signal with a threshold value to generate a control signal (control); and shutter switch (410) for selectively substantially transmitting or blocking radiation propagating along the second path ($A_1$, $A_2$) in response to the control signal.

10 Claims, 6 Drawing Sheets

U.S. PATENT DOCUMENTS

| | | | |
|---|---|---|---|
| 6,504,630 B1 * | 1/2003 | Czarnocha et al. | 398/15 |
| 6,532,089 B1 | 3/2003 | Asahi | |
| 6,839,515 B1 * | 1/2005 | Jahreis et al. | 398/5 |
| 6,973,267 B1 * | 12/2005 | Arecco et al. | 398/4 |

FOREIGN PATENT DOCUMENTS

| | | |
|---|---|---|
| EP | 0 581 138 A1 | 2/1994 |
| EP | 0 928 082 A1 | 7/1999 |
| EP | 1 017 192 A1 | 7/2000 |
| EP | 1130805 A1 * | 9/2001 |
| GB | 2 293 708 A | 4/1996 |
| GB | 2 327 020 A | 1/1999 |
| JP | 03096025 A | 4/1991 |
| JP | 3205929 | 9/1991 |
| JP | 05030034 A | 2/1993 |
| JP | 2000-236303 | 8/2000 |
| WO | WO 9948229 A1 * | 9/1999 |

* cited by examiner

APPARATUS FOR OPTICAL PATH MONITORING AND AN OPTICAL SHUTTER FOR PREVENTING SIGNAL TRANSIMISSION IN A FAULTY OPTICAL PATH

BACKGROUND OF THE INVENTION

Field of the Invention

The present invention relates to an optical shutter, in particular, but not exclusively, to an optical shutter for shutting down one or more communication system optical paths in the event of system failure, for example in the event of an optical fibre waveguide break.

Contemporary optical communication systems comprise a plurality of spatially disposed nodes interlinked through optical fibre waveguides, the waveguides operable to convey modulated information-bearing optical radiation between the nodes. The information is typically partitioned into channels, each channel having a range of radiation wavelengths associated therewith; such partitioning is known as wavelength division multiplexing (WDM).

In the aforementioned communication systems, it is established practice to arrange the nodes in ring groupings. Optical fibre waveguides linking adjacent nodes in the ring groupings are known as sections. Where such groupings each have a diameter in the order of several kilometers, the groupings are known as metro-rings. The metro-rings are often of a sufficiently small diameter to circumvent the need for optical amplification therein, namely the rings are passive. When the metro-rings are somewhat larger, one or more optical amplifiers are typically incorporated therein. Optical amplifiers, for example erbium doped fibre amplifiers (EDFA), are costly items and therefore are only employed when absolutely necessary to ensure an acceptable system optical signal-to-noise ratio.

It is conventional practice for each optical communication system ring to employ two optical fibre loops, one loop for conveying WDM radiation in a clockwise direction therearound and another loop for conveying WDM radiation in a counter clockwise direction therearound. Duplication of loops assists to ensure that communication between nodes in the ring is sustained in the event of one of the loops being disabled. The loops are operable to convey WDM radiation which is often an aggregate of radiation from a plurality of modulated laser sources or an output of one or more EDFAs; this aggregate radiation can often have a power in the order of several 10's of mW which corresponds to Class IIIA or Class IIIB laser radiation power. Such power levels can be hazardous and hence, for safety reasons, it is conventional practice to have automatic shutdown facilities in the event of one or more of the loops breaking, for example due to fracture of an optical fibre waveguide being detected.

Automatic shutdown is normally achieved in an optical communication system by turning off an EDFA feeding radiation into a section when the system detects a severe reduction or loss of optical radiation power received from that section.

In the aforementioned metro-rings, it is conventional practice to insert passive nodes on optical fibre waveguides associated with sections, such passive nodes being devoid of optical amplification. Where normal conventional section shutdown operates on EDFAs feeding into these sections, this shutdown results in a cessation of radiation transmission into the sections. Where the WDM radiation includes a protection channel in addition to normal working channels, shutdown has the effect of disabling both working and protection channels so that all communication traffic to the passive nodes fails even in the event of one of the fibre paths to each of the passive nodes remaining intact. Thus, shutdown of whole sections in a ring grouping results in a potentially unnecessarily severe reduction of services provided through the passive nodes.

In ring groupings of nodes comprising passive nodes included in sections between active nodes responsible for implementing automatic shutdown, it is possible for the passive nodes to insert sufficient radiation power for the active nodes to interpret such radiation power as being a normal working situation in which case the active nodes will fail to apply automatic shutdown even though an optical fibre waveguide break has occurred. In this situation, active nodes do not shut down their optical amplifiers and so dangerous levels of radiation are launched into fibre waveguides towards breaks.

Thus, the inventor has appreciated that there is a problem as elucidated in the foregoing associated with conventional automatic shutdown, especially where passive nodes are incorporated into sections of optical communication systems.

The inventor has devised a solution which addresses the aforementioned problem, the solution involving the incorporation of one or more optical shutters into passive nodes inserted into sections of the optical communication systems.

SUMMARY OF THE INVENTION

According to a first aspect of the invention, there is provided a node for a WDM communication system, the node being connectable to other nodes of the communication system by first and second optical paths along which WDM radiation propagates in opposite directions between the nodes, the node comprising: add/drop multiplexing means for adding and dropping at least one WDM channel at the node; characterised by at least one optical shutter comprising: measuring means for monitoring power of WDM radiation input to the node along the first path and for generating a corresponding radiation power indicative signal; controlling means for comparing the indicative signal with a threshold value to generate a control signal; and switching means for selectively substantially transmitting or blocking WDM radiation output from the node along the second path in response to the control signal.

The inclusion of the shutter provides the advantage that it is capable of attenuating dangerous levels of radiation being output from the node along the second path in an event of a break or fracture occurring in one or more of the first and second paths.

Preferably, the controlling means and the switching means are operable to block WDM radiation output along the second path when the indicative signal falls in magnitude to less than the threshold value. A condition where the indicative signal is less than the threshold value can correspond to a break in the first path, hence the shutter can be effective at preventing dangerous levels of radiation passing through the switching means towards such a break which may also have occurred in the second path.

Conveniently, when constructing the shutter, the measuring means includes an optical coupler and a radiation detector, the coupler being operable to divert a portion of the WDM radiation to the detector for detection therein to generate the indicative signal. Use of such a coupler can provide the benefit that only a small perturbation occurs to the WDM radiation propagating along the first path.

For practical reasons, the coupler conveniently comprises one or more of a fusion spliced fibre coupler, and a 1×N optical waveguide coupler for diverting a portion of the information-bearing radiation to the detector. These couplers are especially suited for use in the shutter for reasons of their low relative cost and relatively low insertion loss.

Preferably, the switching means comprises one or more of a liquid crystal optical attenuator, a thermally controlled optical attenuator, a charge carrier dispersion modulator, an electromechanical optical switch or an optical micromachined optical structure (MEMs) device. These attenuators and modulator are, for practical reasons, well suited for use in attenuating WDM radiation.

In WDM communication system, it is desirable also to communicate between nodes, supervisory information for supervising control of the system. To enable communication of such supervisory information, it is preferable that the measuring means is succeeded along the first path by radiation dropping means for diverting a portion of the WDM radiation corresponding to a supervisory channel bearing communication system supervisory information for the first path, the supervisory information for use in controlling the system. Additionally, the switching means is preferably succeeded along the second path by radiation adding means for adding radiation corresponding to a supervisory channel to the second path. The latter provides the advantage that in the event of WDM radiation being blocked by the switching means the node continues to attempt to transmit at least the supervisory channel.

Preferably, the multiplexing means is operable to add and drop a working channel and a protection channel from the first and second optical paths. The node thereby is capable of providing communication access to the system. Moreover, in order to improve reliability of the system, the node is operable to use the protection channel for communication when the working channel is inoperative.

Beneficially, to reduce cost, the node is advantageously a passive node, namely it is devoid of optical amplification for amplifying radiation propagating in the first and second optical paths. The node of the present invention finds particular application in WDM communication system comprising a ring configuration. In such system configuration the first and second optical paths to which the node is connectable comprise clockwise and anti-clockwise communications paths. Protected Communication rings incorporating clockwise and anti-clockwise paths provide the benefit of improved reliability in the event of one of the paths becoming defective, for example due to an optical fibre waveguide break. Preferably the communication ring is a metro ring.

Advantageously the node includes a respective optical shutter that is operable to selectively transmit or block WDM radiation output from the node along the first and second optical paths.

BRIEF DESCRIPTION OF THE DRAWINGS

Embodiments of the invention will now be described, by way of example only, with reference to the following drawings in which.

DETAILED DESCRIPTION OF THE PREFERRED EMBODIMENT

In order that the invention is better understood the problems arising in known optical communication systems with automatic shutdown when a fibre waveguide break or optical amplifier failure occurs will firstly be described.

Figure 1:
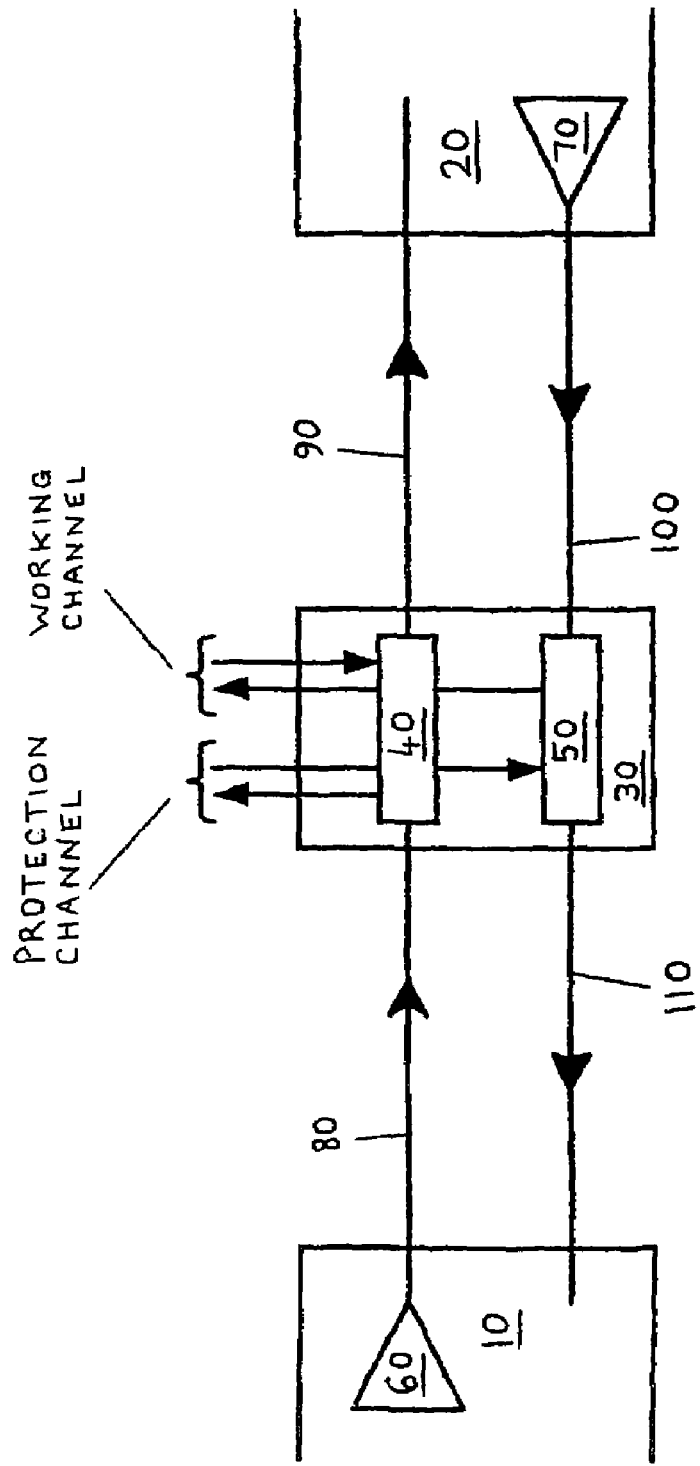
FIG. 1 is an illustration of a prior art optical fibre waveguide section interlinking two active nodes of a communication system, the section including a passive node.

In FIG. 1, there is shown first and second active nodes 10, 20 respectively of an optical communication system, and a passive node 30 interposed in a section linking the active nodes 10, 20 together. The passive node 30 incorporates first and second passive add/drop optical multiplexers 40, 50 respectively. Moreover, the active nodes 10, 20 include first and second optical amplifiers 60, 70 respectively.

In the section, there are four optical fibre waveguides, namely a first waveguide 80, a second waveguide 90, a third waveguide 100 and a fourth waveguide 110. The first waveguide 80 is connected from the first amplifier 60 to an optical input port of a first multiplexer 40. The second waveguide 90 is connected from an optical output port of the first multiplexer 40 to an optical input port of the second node 20. The third waveguide 100 is connected from an optical output port of the second amplifier 70 to an optical input port of the second multiplexer 50. The fourth waveguide 110 is connected from an optical output of the second multiplexer 50 to an optical input port of the active node 10. As will be appreciated the first and second waveguides 80, 90 constitute a first transmission path from the first node 10 to the second node 20 and the third and fourth waveguides 100, 110 constitute a second transmission path from the second node 20 to the first node 10.

The multiplexers 40, 50 each comprise dielectric filters and are operable to divert a working channel present in WDM radiation propagating through the section out from the passive node 30 and also to add optical radiation at a wavelength range corresponding to the working channel. Moreover, each multiplexer 40, 50 is also operable to divert a protection channel present in the WDM radiation propagating through the section out from the passive node 30 and also to add optical radiation at a wavelength range corresponding to the protection channel. Furthermore, each multiplexer 40, 50 is additionally operable to divert at least part of the radiation of a supervisory channel present in the WDM radiation for reception at supervisory electronic circuits (not shown) included within the node 30.

In operation, WDM information-bearing radiation comprising a number of channels is output from the first amplifier 60 and propagates along the first waveguide 80 to the add/drop multiplexer 40. The multiplexer 40 isolates radiation corresponding to the worker channel, to the protection channel and also to the supervisory channel and outputs, namely drops, the radiation at the passive node 30. Moreover, the multiplexer 40 also receives radiation input to the passive node 30 at wavelengths corresponding to the working channel, the protection channel and the supervisory channel, and then adds it to radiation propagating through the multiplexer 40 to provide output radiation which is launched into the second waveguide 90 for propagation to the second active node 20.

In a similar manner, WDM information-bearing radiation comprising a number of channels is output from the second amplifier 70 and propagates along the third waveguide 100 to the second add/drop multiplexer 50. The multiplexer 50 isolates radiation corresponding to the worker channel, to the protection channel and to the supervisory channel and outputs, namely drops, the radiation at the passive node 30. Moreover, the multiplexer 50 also receives radiation input to the passive node 30 at wavelengths corresponding to the working channel, the protection channel and the supervisory channel, and then adds it to radiation propagating through the multiplexer 50 to provide output radiation which is launched into the fourth waveguide 110 for propagation to the first active node 10.

The supervisory electronic circuits receive radiation of the supervisory channel dropped at the passive node 30 and interpret instructions conveyed therein which are pertinent to functioning of the node 30. These instructions determine whether or not the protection channel is to be used and in which direction radiation corresponding to the working channel or the protection channel is to be directly, namely towards the first active node 10 via the second multiplexer 50 or towards the second active node 20 via the first multiplexer 40.

Figure 2:
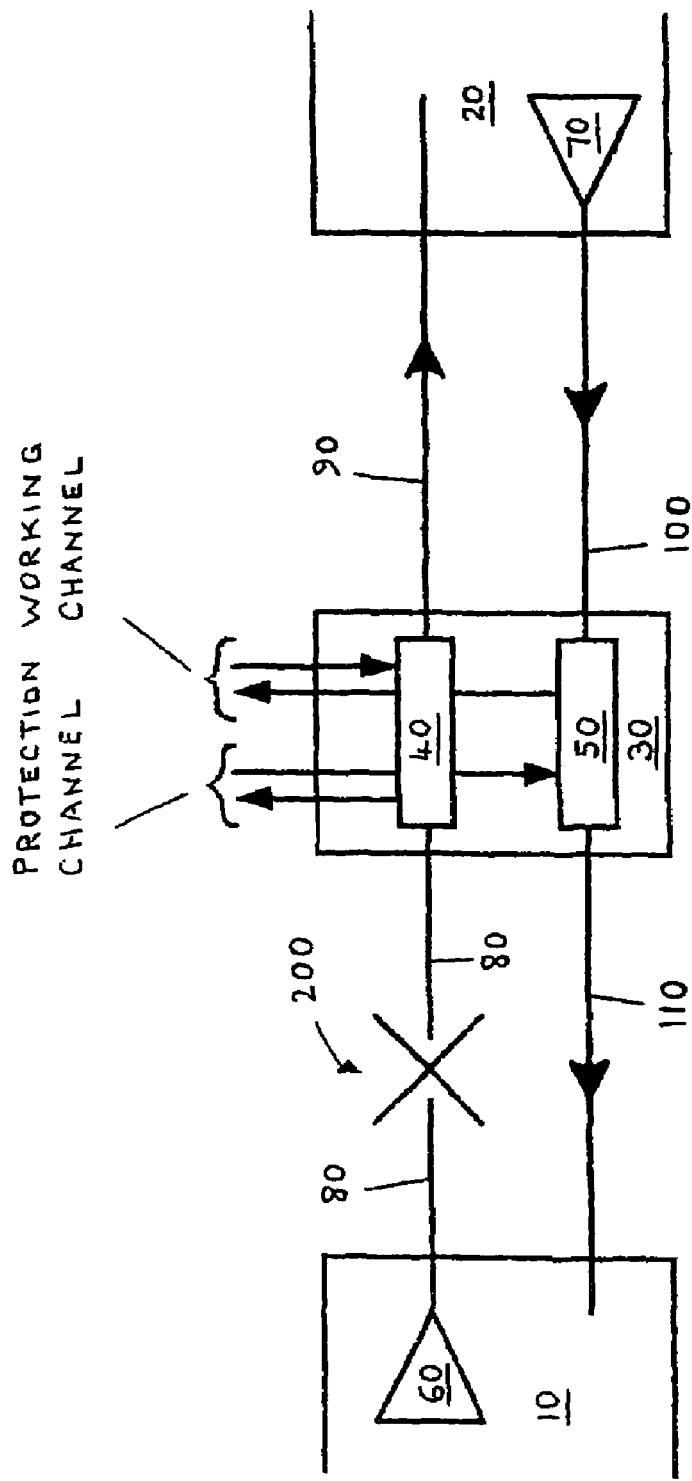
FIG. 2 is an illustration of the section in FIG. 1 subject to a break in one of its fibre waveguides.

Referring now to FIG. 2, the nodes 10, 20, 30 and the fibre waveguides 80, 90, 100, 110 are shown as in FIG. 1 but with the waveguide 80 subject to a break indicated by 200, the break 200 causing an interruption of radiation propagation from the amplifier 60 along the waveguide 80 to the first multiplexer 40. A reduction, as a consequence of the break 200, in radiation received at the second active node 20 is detected which causes it to switch off its amplifier 70 leaving the passive node 30 isolated without communication service provided thereto. The first active node 20 also detects a reduction in received radiation from the amplifier 70 which causes the node 10 to switch off its amplifier 60, thereby preventing dangerous power levels of optical radiation being output at the break 200.

In FIG. 2, if sufficient radiation is input to the passive node 30 such that the second active node 20 interprets this as normal radiation level, there is a risk that the second active node 20 fails to implement the automatic shutdown with a result that dangerous power levels of radiation are output at the break 200.

Figure 3:
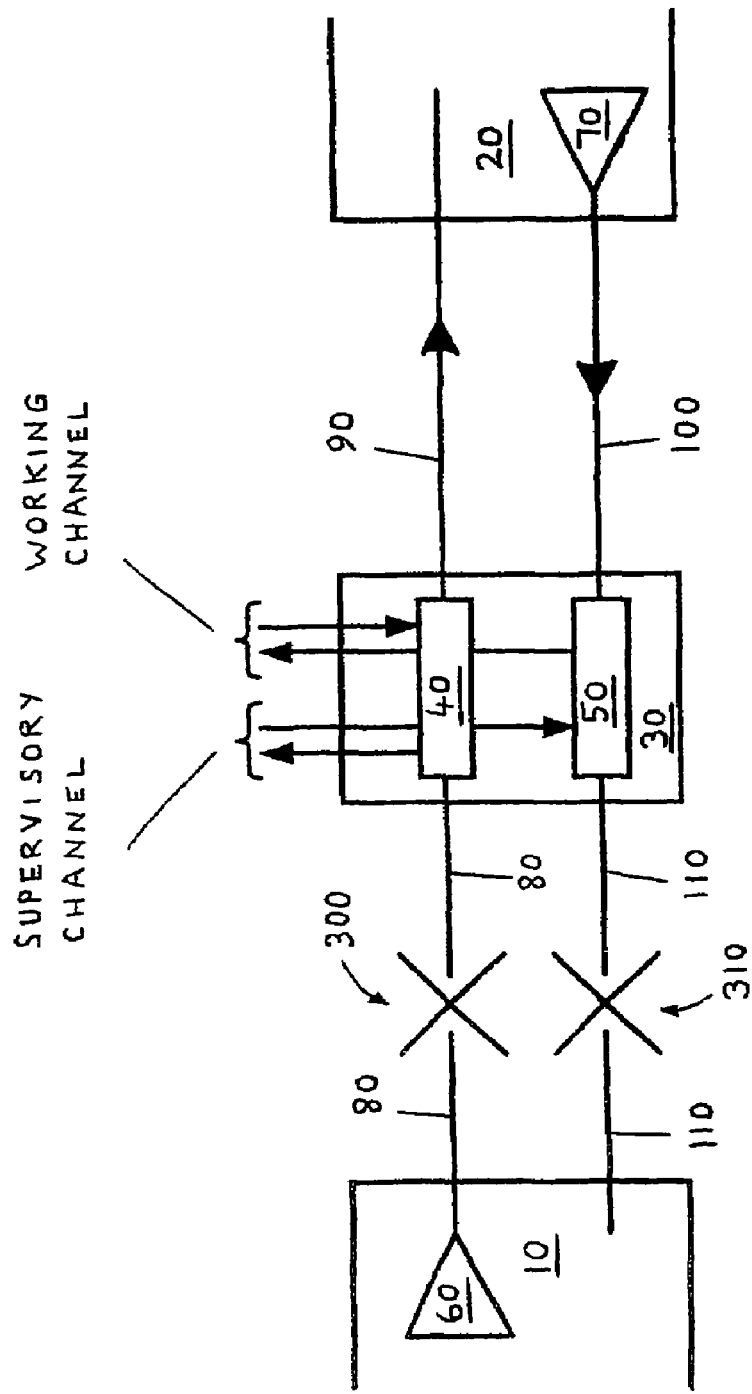
FIG. 3 is an illustration of the section in FIG. 1 subject to a double break of its fibre waveguides.

Referring now to FIG. 3, the nodes 10, 20, 30 and the fibre waveguides 80, 90, 100, 110 are shown as in FIG. 1 but with the waveguides 80, 110 subject to first and second breaks 300, 310 respectively. The first break 300 causes an interruption of radiation propagation from the amplifier 60 along the waveguide 80 to the first multiplexer 40. Moreover, the second break 310 causes an interruption of radiation propagation from the second amplifier 70 via the second multiplexer 50 to the first active node 10.

When the breaks 300, 310 occur, the second active node 10 detects a reduction in received power and proceeds to switch off its amplifier 70. Likewise, the first active node 10 also detects a reduction in received power and switches off its amplifier 60.

If, in FIG. 3, sufficient radiation power is input at the passive node 30 and conveyed to the second active node 20, the second node 20 can interpret this radiation as arising from the amplifier 60. As a consequence, the second node 20 would continue to output radiation at its amplifier 70 with a result that dangerous levels of radiation would be output at the second break 310.

It will be appreciated from the foregoing with reference to FIGS. 2 and 3 that conventional automatic shutdown in response to one or more fibre waveguide breaks can result in loss of communication to the passive node 30 even though some of the waveguides are still potentially available for conveying information traffic to the passive node 30. Moreover, a dangerous situation can arise where sufficient radiation power is input at the passive node 30 to prevent automatic shutdown being applied which results in dangerous levels of radiation being sustained at fibre waveguide breaks.

Figure 4:
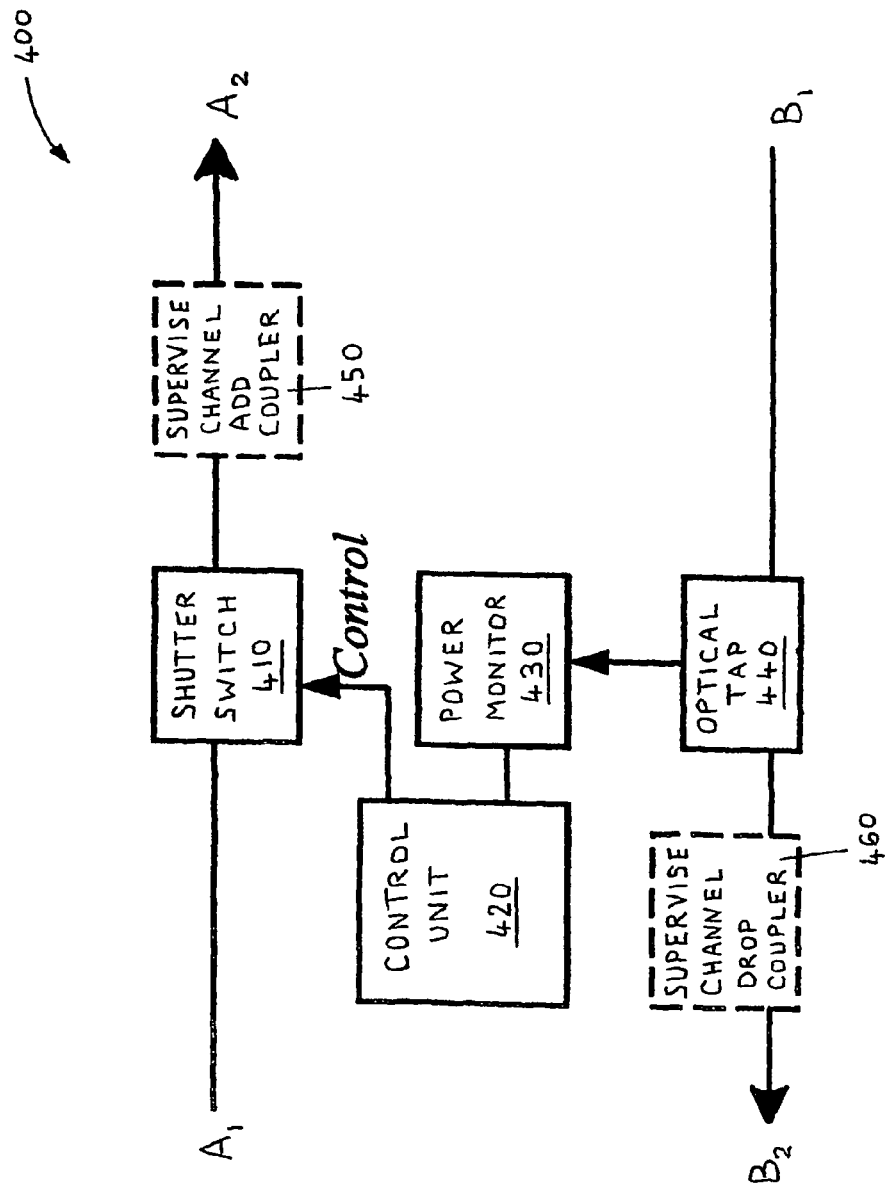
FIG. 4 is a schematic diagram of an optical shutter according to the invention.

In order to address shortcomings of conventional automatic shutdown, the inventors have devised an optical shutter which can be incorporated into the passive node 30. The shutter is illustrated in FIG. 4 and indicated generally by 400. The shutter 400 comprises an optical shutter switch 410, a control unit 420, a power monitor 430 and an optical tap 440. Moreover, the shutter 400 can optionally also include a supervisory channel add coupler 450 and a supervisory channel drop coupler 460.

Interconnection within the shutter 400 will now be described. The shutter 400 includes first and second optical input ports $A_1$, $B_1$ respectively and also first and second optical output ports $A_2$, $B_2$ respectively. The first input port $A_1$ is coupled to an optical input port of the shutter switch 410, and an output port of the switch 410 is connected via the supervisory channel add coupler 450 to the first output port $A_2$. Moreover, the second input port $B_1$ is connected to an optical input port of the optical tap 440. Furthermore, an optical output port of the optical tap 440 is coupled via a the supervisory drop coupler 460 to the second output port $B_2$.

An optical monitor output of the tap 440 is connected to an optical input of the power monitor 430. The monitor 430 includes a power monitor output which is connected to an input of the control unit 420. A control output of the control unit 420 is connected to a control input of the optical shutter 410.

The optical tap 440, the supervisory channel add coupler 450 and the supervisory channel drop coupler 460 are preferably fusion-spliced couplers although other types of couplers can alternatively be used. The optical shutter 410 is preferably implemented as a liquid crystal shutter. Moreover, the control unit 420 is preferably implemented in hardware, although it can alternatively be a software function. Furthermore, the power monitor 430 includes an optoelectronic detector and conditioning circuits to provide an output for the control unit 420.

Operation of the shutter 400 will now be described with reference to FIG. 4. WDM communication-traffic modulated radiation received at the first input port $A_1$ propagates through the shutter switch 410 suffering attenuation in the order of 0.5 dB therein and onwards to the supervisory channel add coupler 450. Supervisory channel radiation is added to radiation from the shutter unit 410 at the coupler 450 and propagates as aggregate radiation to the first output port $A_2$.

Radiation received at the second input port $B_1$ propagates to the optical tap 440 whereat a portion of the received radiation, for example 20% or less, is diverted to the power monitor 430. A remaining portion of the received radiation, for example 80% or more, is transmitted to the supervisory drop coupler 460. A portion of the radiation received at the coupler 460 corresponding to the supervisory channel is diverted at the coupler 460 whereas a remainder of the radiation propagates to the second output $B_2$.

Radiation diverted at the optical tap 440 propagates to the power monitor 430 whereat it is received and a corresponding radiation power indicative signal generated. The indicative signal passes to the control unit 420 which is operable to compare the magnitude of the indicative signal with a power threshold value to determine whether or not a fibre break has occurred. If a fibre break is deemed to have occurred, the control unit 420 outputs a control signal to the shutter switch 410 to switch it from a substantially transparent state, namely preferably with less than 1 dB of attenuation therethrough, to a non-transmissive state, namely with the order of 25 dB or more attenuation therethrough.

Figure 5:
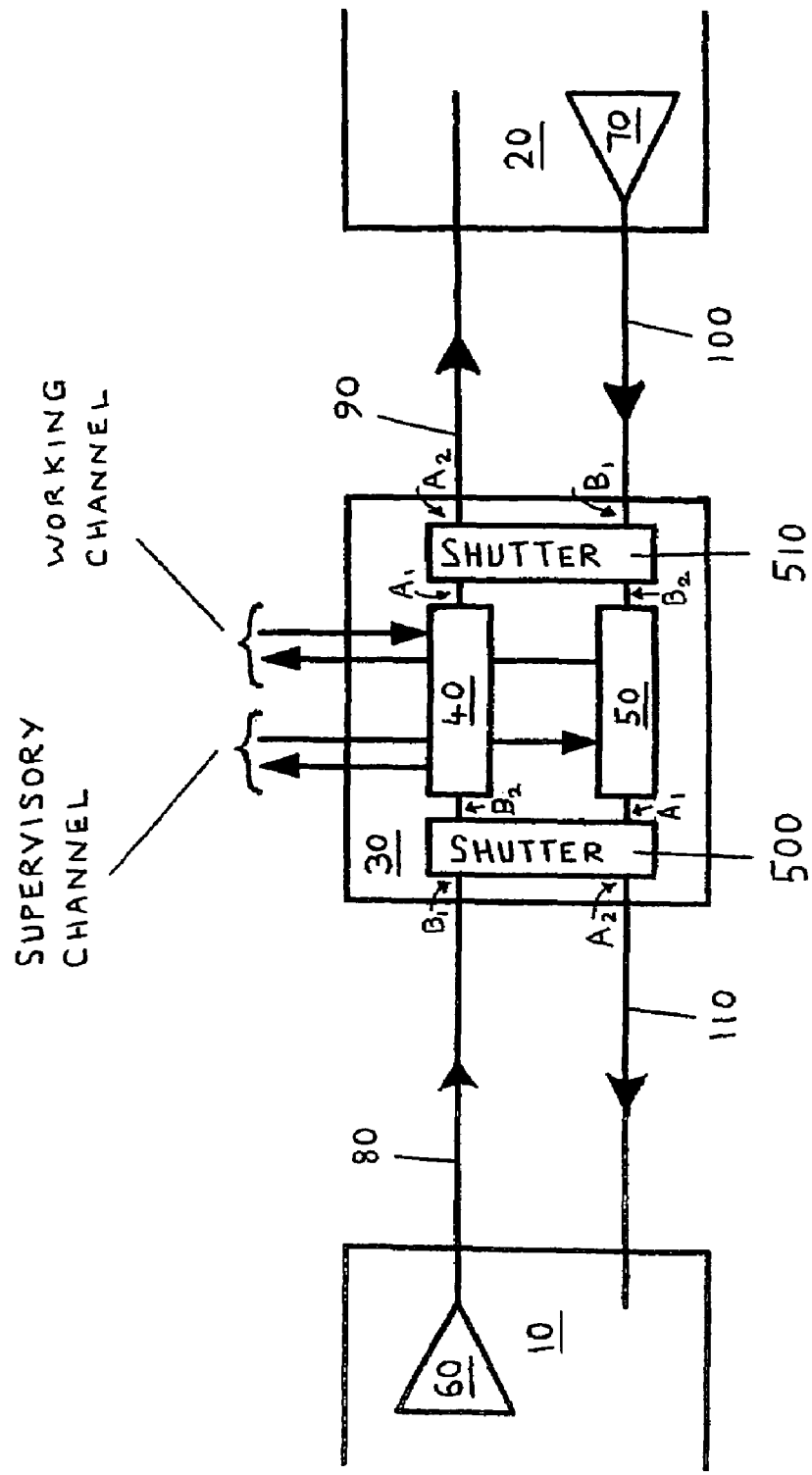
FIG. 5 is a schematic diagram of a passive node included in a section between active nodes, the passive node including two shutters of a type shown in FIG. 4.

Referring next to FIG. 5, there is shown the passive add/drop node 30 modified to include two shutters 500, 510, each of the shutters 500, 510 being identical to the shutter 400 in FIG. 4. The shutters 500, 510 are included within the section between the active nodes 10, 20, namely at both sides of the passive node 30. If necessary, for example to reduce cost, one of the shutters 500, 510 can optionally be omitted.

Figure 6:
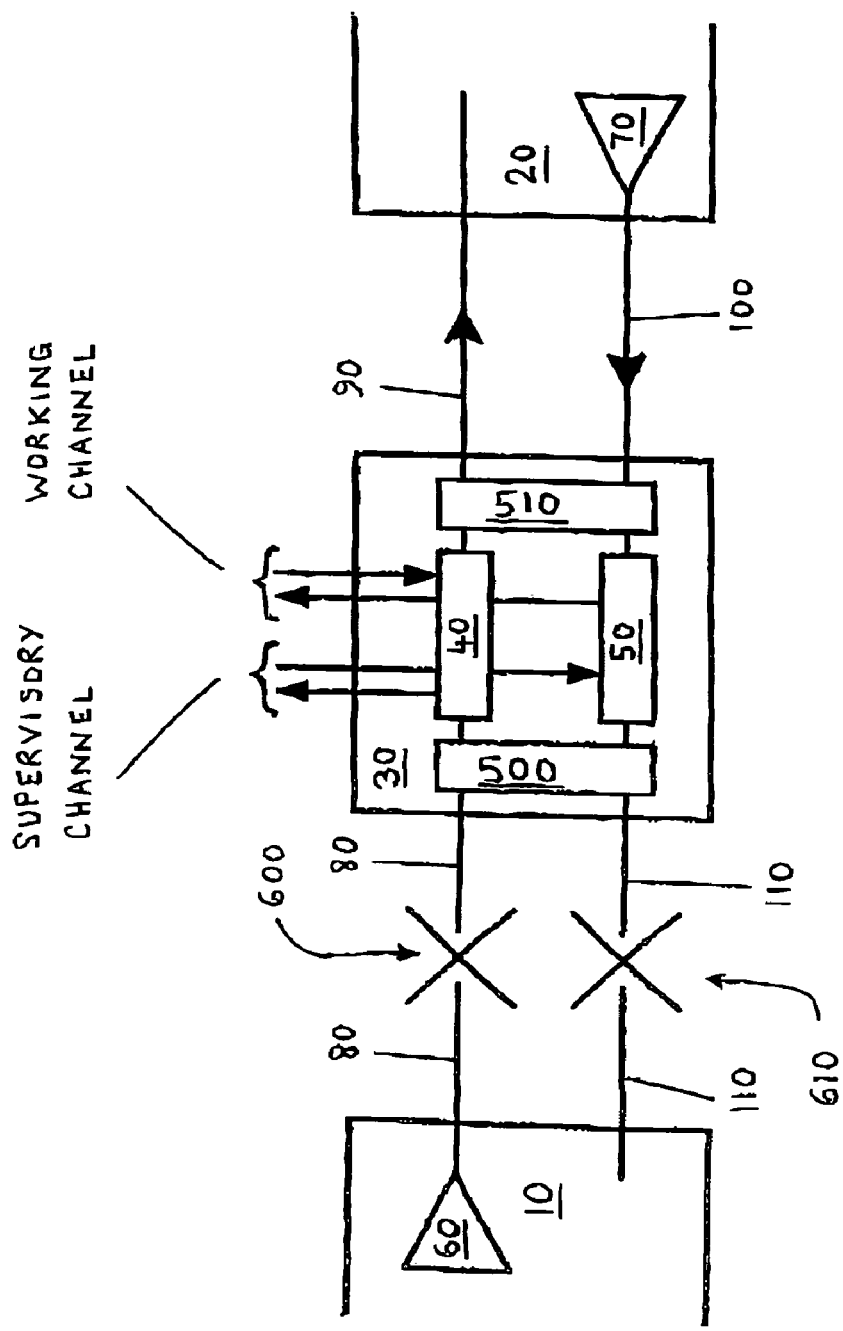
FIG. 6 is a schematic diagram of the section in FIG. 5 subject to two fibre breaks.

In FIG. 6, there is depicted a situation where first and second breaks 600, 610 have occurred in the first and fourth fibre waveguides 80, 110. The first amplifier 60 emits radiation into the first waveguide 80 which propagates to the break 600. As a consequence of the break 600, no radiation is received at the optical tap 440 of the shutter 500; the power monitor 430 of the shutter 500 detects a lack of radiation power and switches its associated shutter switch 410 of the shutter 500 from a substantially transmissive state to an opaque non-transmissive state, namely to a blocking state. The first active-node 10 detects a reduction of power received at its input port and proceeds to implement an automatic shutdown procedure to switch off the first amplifier 60. As a result of the automatic shutdown and blocking by the shutter switch 410, radiation is prevented from reaching the breaks 600, 610. If sufficient radiation power is input at the passive node 30 to cause the second active node 20 to interpret the power received thereat as originating from the amplifier 60 of the first node 10, the shutter 500 prevents radiation output from the amplifier 70 of the second active node 20 reaching the second break 610.

In a situation of the two breaks 600, 610 occurring, communication between the second active node 20 and the passive node 30 can be maintained either by ensuring that the second node 20 receives sufficient radiation so that its automatic shutdown does not switch off the amplifier 70 or by sending instructions from the passive node 30 via the supervisory channel to the second active node 20 to override its automatic shutdown. By such an approach, communication to the passive node 30 can be maintained even in the event of the section on one side of the passive node 30 being disabled by the two breaks 600, 610; moreover, dangerous levels of radiation are also prevented from reaching the breaks 600, 610.

When the breaks 600, 610 occur, the section is re-started by applying a special re-start procedure involving sending test pulses, either automatically or under operator control. The test pulses are generated by temporarily switching the shutter switches 410 subject to shutdown to be momentarily substantially transparent, namely with preferably less than 1 dB attenuation therethrough. For example, when the breaks 600, 610 have been repaired, the shutter switch 410 of the shutter 510 can be made momentarily substantially transparent to allow one or more pulses of radiation through the multiplexer 50 to the first active node 10; the first node 10 detects radiation pulses received thereat and, if the pulses are of a magnitude greater than a threshold level, deems the fibre waveguide 110 to be intact. The first node 10 then proceeds to emit radiation into the fibre waveguide 80 which the optical tap 440 of the shutter 500 and its associated power monitor 430 and control unit 420 detect as exceeding a threshold value; the control unit 420 of the shutter 500 then proceeds to switch the shutter switch 410 to be continuously substantially transparent, thereby reestablishing communication from the first active node 10 to the passive node 30.

Alternatively, test pulses can be sent on the supervisory channel to re-establish communication. When supervisory radiation power is received, the shutter 500 is made transparent. Supervisory power is either detected by re-establishment of the supervisory channel or as optical power received at the power monitor 430 of the shutter 500.

It will be appreciated by those skilled in the art of optical communication system design that modifications and variations can be made to the shutter 400 and also to the passive node 30 incorporating one or more of the shutters 400 without departing from the scope of the invention. For example, although the control unit 420 is implemented in hardware, it may alternatively be implemented as a software function. Moreover, the shutter switch 410 is implemented as a liquid crystal device but can be implemented using other types of technology, for example charge carrier dispersion modulators utilising the Kronig-Kramer absorption phenomenon, a thermally driven attenuator, an electromechanical optical switch or an optical micromachined structure (MEMs) device. Furthermore, the optical tap can be implemented as a fusion-spliced fibre coupler or, alternatively, as a 1×N optical waveguide coupler of a type as described in a United States patent U.S. Pat. No. 4,950,045. It is also envisaged that a coupler of the type described in United States patent U.S. Pat. No. 5,410,625 could be employed.

The shutter of the present invention finds particular application in the nodes of an optical fibre ring transmission system having first and second transmission paths, typically two optical fibres, interconnecting the nodes and in which radiation is carried along the paths in counter propagating directions to provide a protection path in the event of a fibre break. More especially, although not exclusively, the present invention is particularly suited to metro-rings which are of a sufficiently short circumference (path length) to circumvent the need for optical amplification within the ring.

The invention claimed is:

1. A node for a wavelength division multiplexing (WDM) communication system, the node being connectable to other nodes of the system by first and second optical paths along which WDM radiation propagates in opposite directions between the nodes, the node comprising:
   a) an add/drop multiplexer for adding and dropping at least one WDM channel at the node;
   b) at least one optical shutter including a power monitor for monitoring power of the WDM radiation input to the node along the first path and for generating a corresponding radiation power indicative signal, and a radiation dropping coupler succeeding the power monitor along the first path, the coupler being operative for diverting from the first path a portion of the WDM radiation after the WDM radiation has been monitored by the power monitor, the portion of the WDM radiation corresponding to a supervisory channel carrying supervisory information for use in controlling the system;
   c) a controller for comparing the indicative signal with a threshold value to generate a control signal; and
   d) a switch for selectively substantially transmitting the WDM radiation output from the node along the second path without amplification and substantially blocking the WDM radiation output from the node along the second path comprising radiation input to the node along the second path, in response to the control signal.

2. The node according to claim 1, wherein the controller and the switch are operable to block the WDM radiation output along the second path when the indicative signal falls in magnitude to less than the threshold value.

3. The node according to claim 1, wherein the power monitor includes an optical coupler and a radiation detector, the coupler being operable to divert a portion of the WDM radiation to the detector for detection therein to generate the indicative signal.

4. The node according to claim 1, wherein the switch comprises at least one selected from the group including a liquid crystal optical attenuator, a thermally controlled optical attenuator, a charge carrier dispersion modulator, an electro-mechanical optical switch, and an optical micromachined optical structure (MEMs) device.

5. The node according to claim 1, wherein the switch is succeeded along the second path by a radiation adding coupler for adding radiation corresponding to a supervisory channel to the second path.

6. The node according to claim 1, wherein the multiplexer is operable to add and drop a working channel and a protection channel from the first and second optical paths.

7. The node according to claim 6, wherein the node is operable to use the protection channel for communication when the working channel is inoperative.

8. The node according to claim 1, wherein the node is devoid of optical amplification for amplifying the WDM radiation propagating in the first and second optical paths.

9. The node according to claim 1, and including a respective optical shutter that is operable to selectively transmit or block the WDM radiation output from the node along the first and second optical paths.

10. The node according to claim 1, wherein the WDM communication system comprises a ring configuration, and wherein the first and second optical paths to which the node is connectable comprise clockwise and anti-clockwise communications paths.

* * * * *

UNITED STATES PATENT AND TRADEMARK OFFICE
CERTIFICATE OF CORRECTION

PATENT NO. : 7,729,613 B2
APPLICATION NO. : 10/432563
DATED : June 1, 2010
INVENTOR(S) : Lauder It is certified that error appears in the above-identified patent and that said Letters Patent is hereby corrected as shown below:

On the Title Pg, Item (54) and Column 1, Line 4, Title, delete "TRANSIMISSION" and insert -- TRANSMISSION --, therefor.

On the Title Pg, Item (57), under "ABSTRACT", Lines 1-13, delete "The invention provides .................. response to the control signal." and insert -- A node for a wavelength division multiplexing communication system having first and second communication paths along which information-bearing radiation propagates in opposite directions. The node includes an add/drop multiplexer; an optical shutter for monitoring a power of the information-bearing radiation propagating along the first path and for generating a corresponding radiation power indicative signal; a control unit for comparing the indicative signal with a threshold value to generate a control signal; and a shutter switch for selectively substantially transmitting or blocking the radiation propagating along the second path in response to the control signal. --, therefor.

Signed and Sealed this

Twelfth Day of October, 2010

David J. Kappos
*Director of the United States Patent and Trademark Office*